UNITED STATES PATENT OFFICE 2,591,577

LUBRICATING OIL CONTAINING DISULFIDE DERIVATIVES OF ORGANO-SUBSTITUTED THIOPHOSPHORIC ACIDS

John P. McDermott, Roselle, N. J., assignor to Standard Oil Development Company, a corporation of Delaware No Drawing. Application March 28, 1950, Serial No. 152,499

4 Claims. (Cl. 252—46.6)

This invention relates to lubricants and other mineral oil products subject to deterioration in the presence of oxygen and to an additive which serves to inhibit such oxidation.

In accordance with the present invention a new class of organic compositions are described which are particularly useful as additives for mineral lubricating oils used in internal combustion engines, in which they act as inhibitors of oxidation. Thus, the additives serve as an aid in the prevention of ring sticking, piston skirt varnish formation, deposition of sludge, and the like. They are particularly useful in inhibiting the normal corrosiveness of the oil when in contact with copper-lead, cadmium-silver, and other similar bearings now widely used in automotive engines. These compounds are likewise suitable for use as antioxidants in other hydrocarbon materials and in organic materials generally where the material is susceptible to deterioration in the presence of oxygen.

The new class of antioxidant compounds are disulfide derivatives of organo-substituted thiophosphoric acids, wherein the organic groups of the thiophosphoric acids are of the type ROCH$_2$CH$_2$—. These groups are derived from "Cellosolves." These compounds may be more precisely defined by the formula

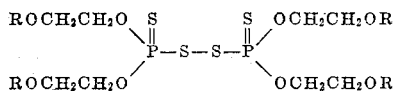

where R is a hydrocarbon radical containing 1 to 7 carbon atoms, R may thus be an aliphatic radical, such as CH$_3$, C$_2$H$_5$—, C$_4$H$_9$— or C$_6$H$_{13}$—; or it may be an aromatic radical, such as the phenyl radical, C$_6$H$_5$—, or the tolyl radical, CH$_3$—C$_6$H$_4$—.

The new additives may be readily prepared by first reacting an ether-alcohol of the Cellosolve type with phosphorus pentasulfide to form an organo-substituted thiophosphoric acid, then further reacting this acid product with an oxidizing agent such as iodine, potassium triiodide, ferric chloride, an oxide of nitrogen, or oxygen itself. It is not intended, however, that the invention be limited in any manner by the oxidizing agent used. The formation of the organo-dithiophosphoric acid disulfides is represented by the following equations:

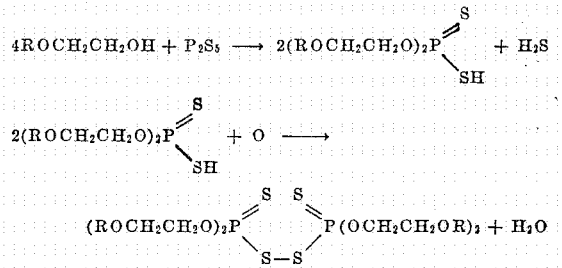

Suitable ether-alcohols which may be employed in the preparation of the new additives include the following: methyl Cellosolve, ethyl Cellosolve, n-butyl Cellosolve, 2-ethylbutyl Cellosolve, cyclohexyl Cellosolve, phenyl Cellosolve, benzyl Cellosolve, tolyl Cellosolve, and the like. Other ether-alcohols within the scope of the present invention may be readily prepared by reacting equimolecular proportions of ethylene oxide and an appropriate alcohol or phenol.

The additives of the present invention are preferably added to lubricating oils in proportions of about 0.01 to 2.0% by weight, and in some cases it may be necessary to employ quantities which are above or below this range. The proportions giving the best results will vary somewhat according to the nature of the additive and of the base stock to which it is added. For commercial purposes, it is convenient to prepare concentrated oil solutions in which the amount of additive in the composition ranges from 25% to 50% by weight, and to transport and store them in such form. In preparing a lubricating oil composition for use as a crankcase lubricant, the additive concentrate is merely blended with the base oil in the required amount.

Below are given detailed descriptions of the preparation of examples of lubricating oil additives described above, as well as laboratory tests and engine tests in which an oil containing the additive was used as the lubricant. It is to be understood that these examples are given as illustrations of the present invention and are not to be construed as limiting the scope thereof in any way.

Example 1

A mixture of 152 g. of methyl Cellosolve (2 mols) and 111 g. of $P_2S_5$ (0.5 mol) was heated for 1 hour at 120° C. in a 3-necked, 1-liter flask equipped with a stirrer, thermometer, and reflux condenser. The product was then filtered and the filtrate transferred to a 3-necked, 2-liter flask equipped with a stirrer. A solution of 82.8 g. (1.2 mols) of $NaNO_2$ in 200 cc. of water was added over a period of 5 minutes, followed by the addition of 118 g. of 50% aqueous $H_2SO_4$ (0.6 mol) over a period of 1 hour, during which time the temperature was maintained at 25–30° C. After stirring for an additional hour at room temperature, 400 cc. of $CHCl_3$ was added to dissolve the reaction product. The organic layer was separated and washed successively with aqueous $NaHCO_3$ solution and distilled water. After drying over $K_2CO_3$, the solvent was removed on a steam bath. A light red liquid was obtained, which upon analysis was found to contain 12% phosphorus and 25.5% sulfur.

Example 2

A mixture of 138 g. of phenyl Cellosolve (1 mol) and 55.5 g. of $P_2S_5$ (0.25 mol) was heated for one hour at 120° C. in a 3-necked one liter flask equipped with a stirrer, thermometer, and reflux condenser. The product was then filtered and the filtrate was transferred to a 3-necked 2-liter flask equipped with a stirrer. A solution of 41.4 g. of $NaNO_2$ (0.6 mol) in 100 cc. of water was added over a period of five minutes followed by the addition of 60 grams of 50% $H_2SO_4$ (0.3 mol) over a period of one hour, during which time the temperature was maintained at 25–30° C. After stirring for an additional hour at room temperature, 200 cc. of $CHCl_3$ was added to dissolve the reaction product. The organic layer was separated and washed successively with $NaHCO_3$ solution and distilled water. After drying over $K_2CO_3$, the solvent was removed on a steam bath. A dark red solid was obtained, which upon analysis was found to contain 8.2% phosphorus and 16.3% sulfur.

Example 3.—Laboratory bearing corrosion test

Blends were prepared containing 0.25% by weight of each of the additives prepared as described in Examples 1 and 2, using as a base oil an extracted Mid-Continent paraffinic lubricating oil of SAE 20 grade. Samples of these blends and a sample of the unblended base oil were submitted to a laboratory test designed to measure the effectiveness of the additive in inhibiting the corrosiveness of a typical mineral lubricating oil toward the surfaces of copper-lead bearings. The tests were conducted as follows:

500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods in like manner. The results are given in the following table as "corrosion life," which indicates the number of hours required for the bearings to lose 100 mg. in weight, determined by interpolation of the data obtained in the various periods.

| Oil or Oil Blend | Bearing Corrosion Life (Hrs.) |
|---|---|
| Unblended Base oil | 9 |
| Base oil + 0.25% Product of Example 1 | 20 |
| Base oil + 0.25% Product of Example 2 | 24 |

Example 4.—Lauson engine test

The product prepared as described in Example 1 was tested in a Lauson engine, using a blend of 1% by weight of the additive in a solvent extracted Mid-Continent oil of SAE 10 grade. For comparison, a sample of the unblended base oil was likewise tested. Each test was conducted for a period of 20 hours, the Lauson engine being operated at 1800 R. P. M. with a 1.5 indicated kilowatt load, 295° F. oil temperature and 300° F. water jacket temperature. Observations were made on the loss in weight of the copper-lead bearing during each test. The results are shown in the following table:

| Oil or Oil Blend | Cu-Pb Bearing Weight Loss (Mg. Bearing) |
|---|---|
| Unblended Base oil | mg.<br>98 |
| Base oil + 1% Product of Example 1 | 59 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or volatilized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8-20 carbon atoms, e. g., octyl alcohol, lauryl alcohol, stearyl alcohol, and the like.

In addition to being employed in lubricants, the additives of the present invention may also be used in other mineral oil products such as motor fuels, hydraulic fluids, torque converter fluids, cutting oils, flushing oils, turbine oils, transformer oils, industrial oils, process oils, and the like, and generally as antioxidants in mineral oil products. They may also be used in gear lubricants, greases and other products containing mineral oils as ingredients.

What is claimed is:

1. A composition consisting essentially of a mineral oil product and 0.01 to 2% by weight of a compound of the formula:

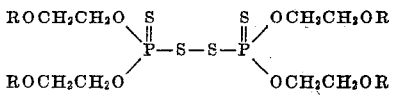

where R is a hydrocarbon radical containing 1 to 7 carbon atoms and selected from the group consisting of phenyl and tolyl radicals.

2. A composition according to claim 1 in which R of the formula is a phenyl radical.

3. A composition consisting essentially of a mineral lubricating oil and an additive as defined in claim 1, the amount of said additive in the composition being 25-50% by weight.

4. A composition consisting essentially of a mineral lubricating oil and an additive as defined in claim 2, the amount of said additive in the composition being 25-50% by weight.

JOHN P. McDERMOTT.

REFERENCES CITED

The following references are of record in the file of this patent:

UNITED STATES PATENTS

| Number | Name | Date |
|---|---|---|
| 2,443,264 | Mikeska | June 15, 1948 |